United States Patent
Futakuchi et al.

(10) Patent No.: US 7,948,835 B2
(45) Date of Patent: May 24, 2011

(54) OPTICAL DISC DEVICE, METHOD FOR ACTIVATING OPTICAL DISC DEVICE, AND CONTROL CIRCUIT

(75) Inventors: Ryutaro Futakuchi, Osaka (JP); Masahiro Birukawa, Osaka (JP)

(73) Assignee: Panasonic Corporation, Osaka (JP)

(*) Notice: Subject to any disclaimer, the term of this patent is extended or adjusted under 35 U.S.C. 154(b) by 240 days.

(21) Appl. No.: 12/470,100

(22) Filed: May 21, 2009

(65) Prior Publication Data
US 2009/0290456 A1    Nov. 26, 2009

(30) Foreign Application Priority Data

May 23, 2008  (JP) .................................. 2008-135131

(51) Int. Cl.
*G11B 7/00* (2006.01)
(52) U.S. Cl. .............. 369/44.23; 369/53.28; 369/112.24
(58) Field of Classification Search .......................... None
See application file for complete search history.

(56) References Cited

U.S. PATENT DOCUMENTS
7,042,826 B2 *   5/2006   Matsui .................... 369/112.24

FOREIGN PATENT DOCUMENTS
JP      2002-157750       5/2002

* cited by examiner

*Primary Examiner* — Wayne R Young
*Assistant Examiner* — Brian Butcher
(74) *Attorney, Agent, or Firm* — Wenderoth, Lind & Ponack L.L.P.

(57) ABSTRACT

An optical disc device includes: a light source; a condensing system including a solid immersion lens for emitting light from the light source onto an optical disc; a gap control circuit for setting a distance between the solid immersion lens and the optical disc to a constant value; a CPU for adjusting a condensing position of emission light from the solid immersion lens with respect to an information recording/reproducing surface of the optical disc by moving a concave lens in a direction of an optical axis; and a focus control circuit for setting the condensing position on the information recording/reproducing surface, while following plane displacement of the information recording/reproducing surface, using a focus error signal. The CPU is operable to correct coma aberration in focus position adjustment by moving the concave lens in a direction perpendicularly intersecting with the optical axis.

10 Claims, 4 Drawing Sheets

OPTICAL DISC DEVICE, METHOD FOR ACTIVATING OPTICAL DISC DEVICE, AND CONTROL CIRCUIT

BACKGROUND OF THE INVENTION

1. Field of the Invention

The present invention relates to an optical disc device for recording a signal in an optical disc and/or reproducing a signal from an optical disc, a method for activating the optical disc device, and a control circuit.

2. Description of the Background Art

As an approach for increasing the recording density of an optical disc, there has been proposed an optical disc device incorporated with an optical head, wherein a condensing system having a large numerical aperture is constructed by combining an objective lens and a solid immersion lens (hereinafter, called as SIL).

According to a system (hereinafter, called as SIL system) using an SIL, a material having a large refractive index (from about 1.8 to 2.0) is used for an SIL and a protective layer of an optical disc, and a recording operation and a reproducing operation are performed, using emission light from the SIL, which is obtained by performing gap control of setting the gap between the SIL and the protective layer of the optical disc to such a small value as about 25 nm.

The numerical aperture of the condensing system is about 1.8, which is about twice of the numerical aperture of BD (Blu-ray Disc).

Using such a large numerical aperture may reduce a dynamic range capable of detecting a focus error signal required in focus control of setting a condensing position (hereinafter, also called as "focus position") of emission light from the SIL on a targeted information recording/reproducing surface of an optical disc, in other words, reduce an allowable range of the focus position with respect to a targeted information recording/reproducing surface.

According to a result of recent research conducted by the inventors of the present application, the dynamic range in the SIL system is extremely narrow i.e. a range of about ±0.12 μm to ±0.24 μm with respect to a targeted information recording/reproducing surface as a reference surface.

It is necessary to set the focus position in advance within a dynamic range capable of detecting a focus error signal to perform focus control with respect to a targeted information recording/reproducing surface. However, as described above, the dynamic range in the SIL system is extremely narrow. Accordingly, considering mounting precision of an SIL and the other optical element constituting an optical head, thickness precision of a protective layer of an optical disc, and a like factor, it is hardly likely that the focus position may be constantly set within the dynamic range capable of detecting a focus error signal with respect to a targeted information recording/reproducing surface.

In view of the above, it is essentially important to provide a focus position adjusting mechanism for setting the focus position within the dynamic range in an optical head.

Employing means similar to a spherical aberration correcting mechanism for BD is effective as a measure for realizing the focus position adjusting mechanism, as recited in e.g. Japanese Unexamined Patent Publication No. 2002-157750.

Specifically, in the above publication, a beam expander constituted of two lenses i.e. a concave lens and a convex lens is provided in the optical head, and one of the lenses is moved in the optical axis direction. Thereby, a change in the divergent degree of beam is converted into a change in the condensing position of beam transmitted through the SIL.

In the following, a focus position adjusting mechanism using a beam expander constituted of two lenses i.e. a concave lens and a convex lens in the SIL system is described referring to FIGS. 7 and 8. In FIG. 8, a feed mechanism constituted of a feed stage 15, a feed screw 16, and a stepping motor 17 is not illustrated.

Referring to FIG. 7, the reference numeral 1 indicates a light beam, and 2 indicates an optical axis of the light beam 1. 3 indicates a concave lens, and 4 indicates a convex lens. The concave lens 3 and the convex lens 4 constitute a beam expander. 5 indicates an objective lens, and 6 indicates an SIL. The objective lens 5 and the SIL 6 constitute a condensing system. 7 indicates an optical disc, 8 indicates one of the information recording/reproducing surfaces of the optical disc 7, 13 indicates an upper surface of the optical disc 7, and 14 indicates a protective layer of the optical disc 7. The protective layer 14 is formed in a region from the information recording/reproducing surface 8 to the upper surface 13.

In the above arrangement, the concave lens 3, the convex lens 4, the objective lens 5, and the SIL 6 are arranged at such positions that the respective centers thereof are aligned with the optical axis 2. The reference numeral 9 indicates a distance (hereinafter, called as a gap) between the upper surface 13 of the optical disc 7 and the SIL 6. The objective lens 5 and the SIL 6 are connected to each other by a fixing member 10. Controlling the objective lens 5 and the SIL 6 by driving an actuator 11 enables to perform gap control of setting the gap 9 to a constant value.

In FIG. 7, solely the gap control by controlling the actuator 11 i.e. position control in vertical direction with respect to the optical disc 7 is described. Tracking control is enabled by providing an actuator other than the actuator 11, and performing position control in horizontal direction with respect to the optical disc 7. The reference numeral 12 indicates an actuator for driving the concave lens 3 in the direction of the optical axis 2. The actuator 12 is operable to perform focus control in response to supply of a predetermined current.

The reference numeral 15 indicates a feed stage. The feed stage 15 is connected to the stepping motor 17 via the feed screw 16, and is operable to integrally move the concave lens 3 and the actuator 12. In this arrangement, in response to supply of a predetermined drive pulse to the stepping motor 17, the feed stage 15 is moved in the direction of the optical axis 2. Thereby, the concave lens 3 and the actuator 12 are integrally moved in the optical axis direction.

Referring to FIG. 7, assuming that a targeted information recording/reproducing surface is the information recording/reproducing surface 8, the focus position is not set on the information recording/reproducing surface 8 or its vicinity. In this state, it is judged that the focus position is not set within the dynamic range capable of detecting a focus error signal with respect to the information recording/reproducing surface 8.

FIG. 8 is a diagram showing a state that the concave lens 3 is moved along the direction of the optical axis 2 by a predetermined distance rightwardly on the plane of FIG. 8, as compared with the state shown in FIG. 7, by operating the feed mechanism constituted of the feed stage 15, the feed screw 16, and the stepping motor 17.

As is obvious from FIG. 8, the divergent degree of a light beam on the right side of the convex lens 4 on the plane of FIG. 8 is smaller than that in FIG. 7, because the distance between the concave lens 3 and the convex lens 4 is decreased. Thereby, the condensing position i.e. the focus position of a light beam through the objective lens 5 and the SIL 6 is shifted to the left position on the plane of FIG. 8, as compared with the state shown in FIG. 7. In this state, it is judged that the focus position is set near the targeted information recording/reproducing surface 8 i.e. within the dynamic range capable of detecting a focus error signal with respect to the information recording/reproducing surface 8.

Although not illustrated, a focus error signal is detected by synthesizing output signals from a photoelectrical converter for detecting the focus error signal, using certain means e.g. an astigmatism method, and a control current obtained by subjecting the focus error signal to a predetermined electrical processing is supplied to the actuator 12. Thereby, focus control with respect to the information recording/reproducing surface 8 is established, and the focus position can be set on the information recording/reproducing surface 8 while following a thickness error of the information recording/reproducing surface 8.

Accordingly, providing the focus position adjusting mechanism as described above referring to FIGS. 7 and 8 in an optical head constituting an optical disc device meets the requirements on focus control for performing a desirable recording/reproducing operation with respect to a targeted information recording/reproducing surface.

However, the following drawback may occur in the conventional focus position adjusting mechanism as described above referring to FIGS. 7 and 8.

Specifically, as shown in FIG. 9, in the case where the concave lens 3 is moved in the direction of the optical axis 2 together with the actuator 12 by the feed mechanism constituted of the feed stage 15, the feed screw 16, and the stepping motor 17 for focus position adjustment, the moving direction of the concave lens 3 may not be in perfect parallel alignment with the optical axis due to a failure in rectilinear movement of the feed mechanism.

FIG. 9 is a diagram showing the above state, wherein the concave lens 3 is displaced to e.g. an upper right position on the plane of FIG. 9, and displacement (decentering) occurs between the center 20 of the concave lens 3 and the optical axis 2. As a result, whereas the light beam 1 is vertically symmetrically with respect to the optical axis 2 on the plane of FIGS. 7 and 8, the light beam 1 transmitted through the concave lens 3 is vertically asymmetrically with respect to the optical axis 2 on the plane of FIG. 9.

If a light beam whose symmetry with respect to the optical axis 2 is lost is transmitted through the condensing system constituted of the objective lens 5 and the SIL 6, coma aberration may occur. As a result, the light beam 1 may be condensed on the targeted information recording/reproducing surface 8 of the optical disc 7 with a certain divergent degree, without being converged into a single point, as shown in FIGS. 7 and 8.

It is well known that generation of coma aberration may result in a seriously adverse effect on recording/reproducing characteristics of an optical disc. Therefore, it is required to eliminate coma aberration in an optical disc device.

The adverse effect by coma aberration is deterioration of follow-up performance with respect to a decentered track, or an increase in the jitter of a reproduction RF signal resulting from distortion in the shape of a beam spot, because a tracking error signal of a sufficiently large amplitude is not obtained, and a gain in tracking control is reduced.

Coma aberration in a general optical disc device for BD can be corrected by changing a relative tilt between an optical disc and an objective lens. However, in the SIL system, as described above, the gap between the SIL 6 and the optical disc 7 is as small as 25 nm. Accordingly, employing a method corresponding to coma aberration correction to be used in a general optical disc device for an optical disc, i.e. a method comprising changing a relative tilt between the SIL 6 and the optical disc 7 is not desirable, because there is a likelihood that the SIL 6 may collide against the optical disc 7.

In focus position adjustment in the SIL system, as far as the moving distance of the concave lens 3 is so small as not to generate coma aberration, the aforementioned drawback is negligible. However, as a result of research conducted by the inventors of the present application, if the focus position adjustment is performed in a range of 20 μm, a moving distance required for the concave lens 3 is as large as about 2 mm. Accordingly, a decentered amount corresponding to the moving distance is about 40 μm, considering mechanical assembly precision or a like factor. If coma aberration by decentering is converted into wavefront aberration, the wavefront aberration is as large as 150 mλ, which greatly exceeds 20 mλ as an allowable value of wavefront aberration for performing a normal recording/reproducing operation.

The value of 20 μm corresponds to a distance from an information recording/reproducing surface as an uppermost layer to an information recording/reproducing surface as a lowermost layer of an optical disc having a multi-layered structure, as a result of research conducted by the inventors of the present application.

If a non-spherical aberration system is constructed by using an aspherical lens as the concave lens 3 and the convex lens 4, a slight decentering may cause a large coma aberration. As a result, it is extremely difficult to realize an optical disc device having a desirable arrangement.

SUMMARY OF THE INVENTION

In view of the above, it is an object of the present invention to provide an optical disc device capable of suppressing coma aberration, while setting the distance between a solid immersion lens and an optical disc to a constant value.

An optical disc device according to an aspect of the invention includes: a light source; a condensing system including a solid immersion lens for emitting light from the light source onto an optical disc; a gap controller for performing gap control of setting a distance between the solid immersion lens and the optical disc to a constant value; a focus position adjuster for performing focus position adjustment of adjusting a condensing position of light to be emitted from the solid immersion lens with respect to an information recording/reproducing surface of the optical disc; a focus error signal generator for generating a focus error signal based on light from the information recording/reproducing surface; a focus controller for performing focus control of setting the condensing position on the information recording/reproducing surface, while following plane displacement of the information recording/reproducing surface, using the focus error signal; and a coma aberration corrector for performing coma aberration correction of correcting coma aberration in the focus position adjustment by moving at least one of lenses to be used in the focus position adjustment in a direction perpendicularly intersecting with an optical axis.

In the optical disc device having the above arrangement, coma aberration by decentering resulting from focus position adjustment can be corrected, without changing a relative tilt between the optical disc and the solid immersion lens. Accordingly, coma aberration can be suppressed, with the distance between the solid immersion lens and the optical disc being set to the constant value.

These and other objects, features and advantages of the present invention will become more apparent upon reading the following detailed description along with the accompanying drawings.

DETAILED DESCRIPTION OF THE PREFERRED EMBODIMENT

Figure 1:
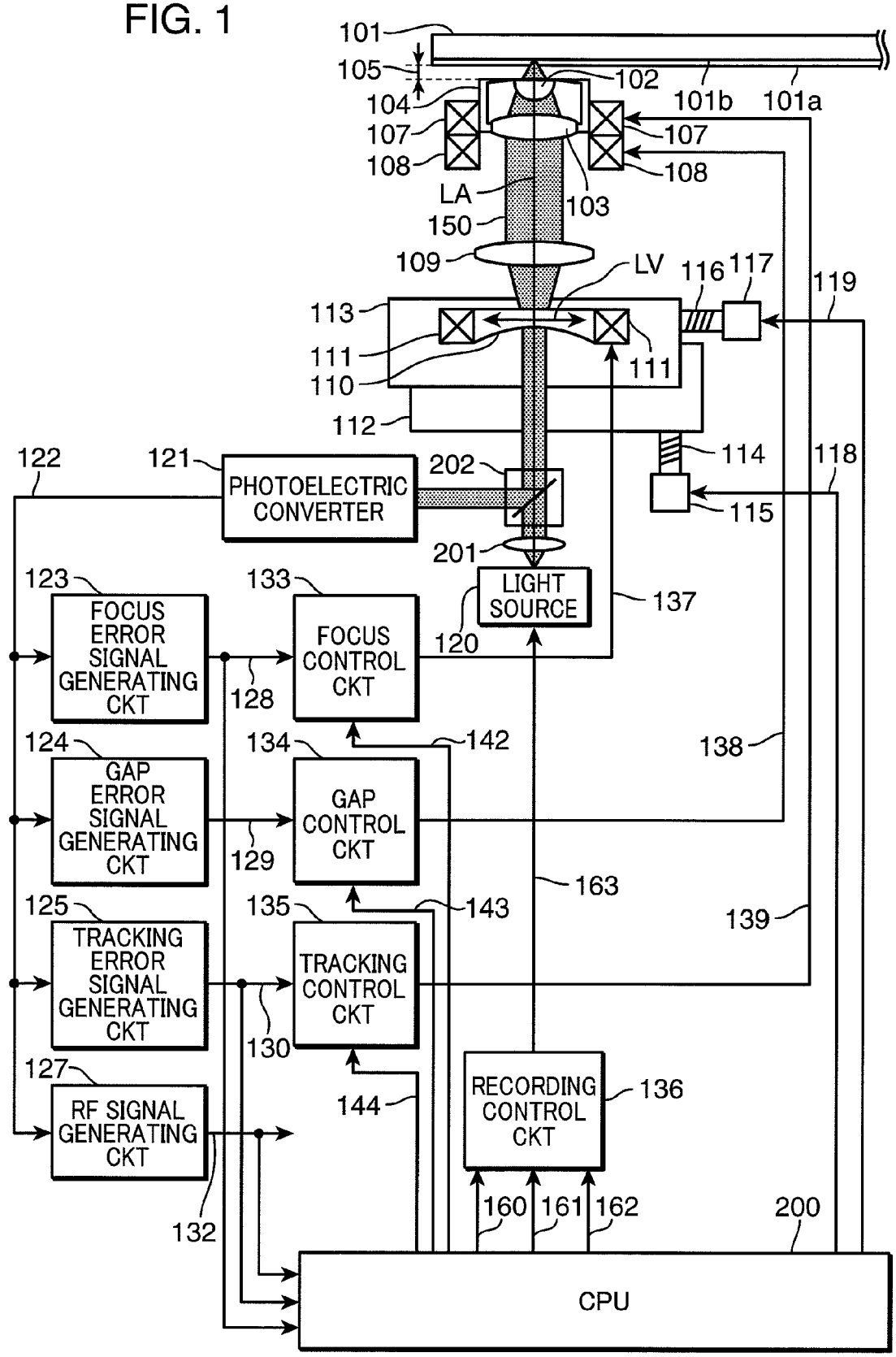
FIG. 1 is a schematic diagram showing an arrangement of an optical disc device in accordance with a first embodiment of the invention.
Figure 2:
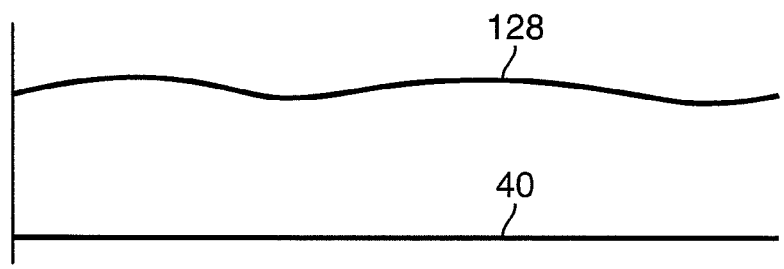
FIG. 2 is a waveform diagram showing a focus error signal in a state that focus position adjustment is not performed.

In the following, an embodiment of the invention is described referring to the drawings.

First Embodiment

Figure 7:
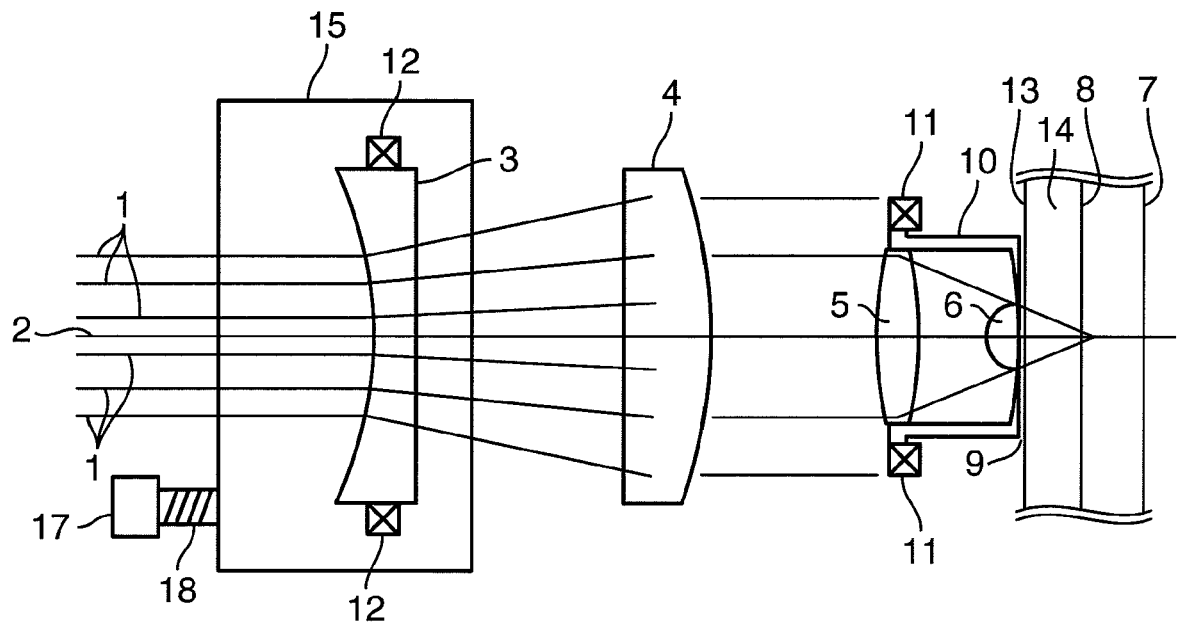
FIG. 7 is a diagram showing an arrangement of a focus position adjusting mechanism of a conventional optical disc device.
Figure 8:
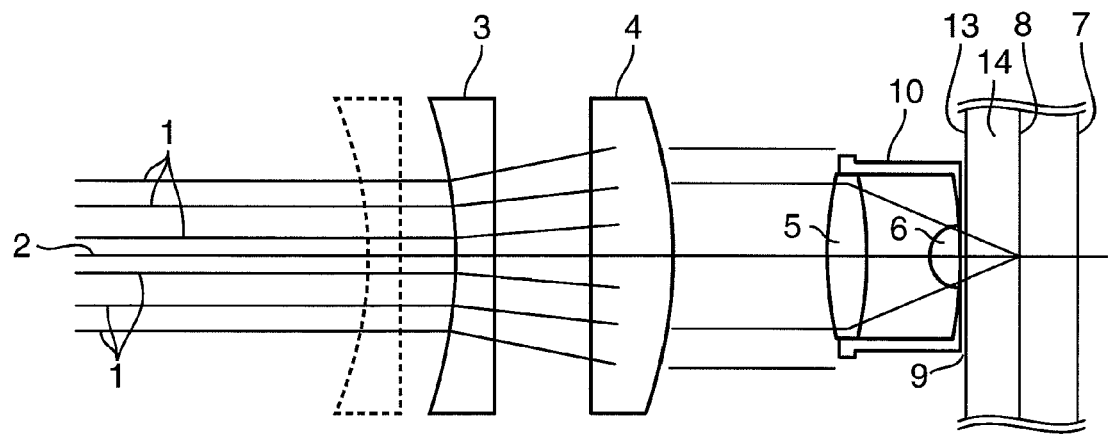
FIG. 8 is a diagram for describing an operation of the focus position adjusting mechanism of the conventional optical disc device.
Figure 9:
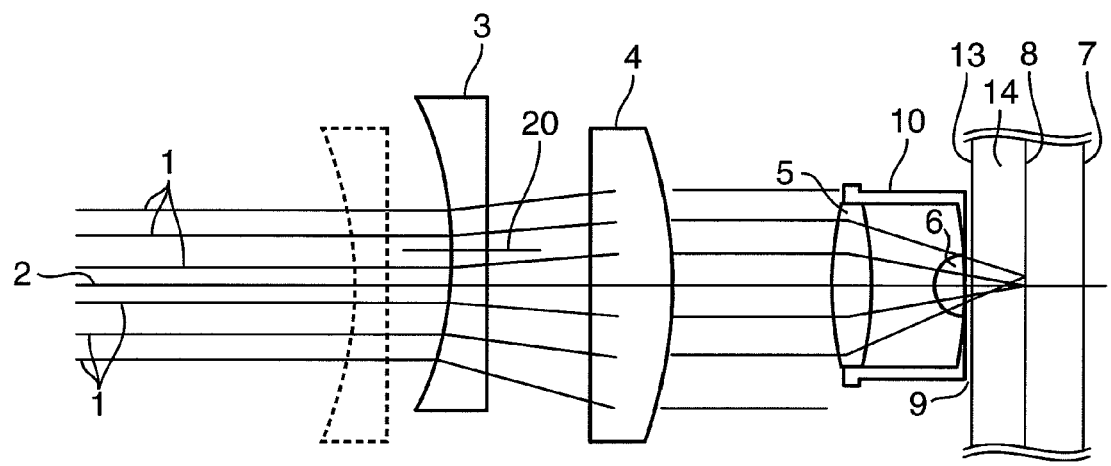
FIG. 9 is a diagram for describing a problem to be overcome in the focus position adjusting mechanism of the conventional optical disc device.

FIG. 1 is a diagram showing an arrangement of an optical disc device in accordance with the first embodiment of the invention. Elements in FIG. 1 substantially identical or equivalent to those described in the section of Description of the Background Art referring to FIGS. 7, 8, and 9 are indicated by the same reference numerals.

Referring to FIG. 1, the optical disc device includes an SIL 102, an objective lens 103, a fixing member 104, a tracking control actuator 107, a gap control actuator 108, a convex lens 109, a concave lens 110, a focus control actuator 111, feed stages 112 and 113, feed screws 114 and 116, stepping motors 115 and 117, a light source 120, a collimator lens 201, a beam splitter 202, a photoelectric converter 121, a focus error signal generating circuit 123, a gap error signal generating circuit 124, a tracking error signal generating circuit 125, an RF signal generating circuit 127, a focus control circuit 133, a gap control circuit 134, a tracking control circuit 135, a recording control circuit 136, and a CPU 200.

The reference numeral 101 indicates an optical disc, 101a indicates a surface of the optical disc 101, and 105 indicates a gap (distance) between the surface 101a of the optical disc 101 and a surface of the SIL 102. The optical disc 101 has multiple information recording/reproducing surfaces. In FIG. 1, one of the information recording/reproducing surfaces i.e. an information recording/reproducing surface 101b is shown. The optical disc is not specifically limited to a multi-layered optical disc having multiple information recording/reproducing surfaces, but may be a single-layered optical disc having a single information recording/reproducing surface.

Among the above parts, at least the SIL 102, the objective lens 103, the fixing member 104, the tracking control actuator 107, the gap control actuator 108, the convex lens 109, the concave lens 110, the focus control actuator 111, the feed stages 112 and 113, the feed screws 114 and 116, the stepping motors 115 and 117, the light source 120, the collimator lens 201, the beam splitter 202, and the photoelectric converter 121 constitute an optical head. The optical head is constructed to be movable in a radial direction of the optical disc 101 by a traverse motor (not shown) or a like device. The optical disc 101 is rotatably driven by a spindle motor (not shown).

The SIL 102 and the objective lens 103 are connected by the fixing member 104, and are integrally constructed with the fixing member 104. The SIL 102 and the objective lens 103 constitute a condensing system for emitting light from the light source 120 onto the optical disc 101.

The convex lens 109 and the concave lens 110 constitute a beam expander. The convex lens 109 is a fixed lens fixed to the optical head, and the concave lens 110 is a movable lens movably supported in a direction (hereinafter, also called as "optical axis direction") of an optical axis LA of a light beam 150, and a right-angled direction LV (i.e. a direction perpendicularly intersecting with the optical axis direction, or a direction indicated by the two arrows in FIG. 1) with respect to the optical axis LA. In this embodiment, moving the concave lens 110 in the optical axis direction i.e. upward or downward direction on the plane of FIG. 1 changes the distance between the convex lens 109 and the concave lens 110, and consequently changes a divergent angle of the light beam 150. This enables to change the condensing position i.e. adjust the focus position of a beam transmitted through the SIL 102 within the optical disc 101.

Further, as shown in FIG. 1, the focus control actuator 111 and the concave lens 110 are integrally constructed. In response to supply of a predetermined current from the focus control circuit 133 to the focus control actuator 111 to move the concave lens 110 along the optical axis direction in a very small range enables to perform focus control of setting the focus position on the information recording/reproducing surface 101b, while following plane displacement of the information recording/reproducing surface 101b.

The feed stage 113 is movably supported in the right-angled direction LV i.e. leftward or rightward direction on the plane of FIG. 1. The feed stage 112 is movably supported in the optical axis direction i.e. upward or downward direction on the plane of FIG. 1. The feed stages 112 and 113 are constructed in such a manner that moving the feed stage 112 in the optical axis direction results in moving the feed stage 113 in the optical axis direction, but moving the feed stage 113 in the right-angled direction LV does not result in moving the feed stage 112.

The feed stage 112 is connected to the stepping motor 115 via the feed screw 114. Similarly, the feed stage 113 is connected to the stepping motor 117 via the feed screw 116. The CPU 200 is operable to supply drive pulses 118 and 119 to the stepping motors 115 and the stepping motor 117, respectively, using an internally provided drive circuit. Thereby, the stepping motor 115 and the stepping motor 117 are driven individually, the feed stage 112 is moved in the optical axis direction, and the feed stage 113 is moved in the right-angled direction LV. The moving distance of the feed stage 112 is determined by the pitch of the feed screw 114, and the number of the drive pulses 118 to be supplied to the stepping motor 115. The moving distance of the feed stage 113 is determined by the pitch of the feed screw 116, and the number of the drive pulses 119 to be supplied to the stepping motor 117.

In this embodiment, the convex lens 109, the concave lens 110, the feed stage 112, the feed screw 114, the stepping motor 115, and the CPU 200 constitute a focus position adjuster for performing focus position adjustment of adjusting the condensing position of light to be emitted from the SIL 102 with respect to the information recording/reproducing surface 101b of the optical disc 101. The convex lens 109, the concave lens 110, the feed stage 112, the feed screw 114, and the stepping motor 115 constitute a focus position adjusting mechanism for performing focus position adjustment, and the CPU 200 functions as a focus position adjusting circuit. The arrangement of the focus position adjuster is not specifically limited to the above example, but may be modified in various ways.

Coma aberration occurs due to decentering resulting from focus position adjustment. Accordingly, coma aberration can be corrected by moving the decentered concave lens 110 in the right-angled direction LV. In this embodiment, the feed stage 113, the feed screw 116, the stepping motor 117, and the CPU 200 constitute a coma aberration corrector for performing comma aberration correction of correcting coma aberration in focus position adjustment by moving the concave lens 110 to be used in focus position adjustment in the right-angled direction with respect to the optical axis. The feed stage 113, the feed screw 116, and the stepping motor 117 constitute a coma aberration correcting mechanism for performing coma aberration correction, and the CPU 200 functions as a coma aberration correcting circuit.

The arrangement of the coma aberration corrector is not specifically limited to the above example, but may be modified in various ways, as far as at least one of the lenses constituting the focus position adjuster is movable in the right-angled direction with respect to the optical axis. The method for moving the concave lens 110 in focus position adjustment and coma aberration correction will be described later.

Emission light from the light source 120 is converted into parallel light by the collimator lens 201, and then turned into the light beam 150 while being transmitted through the concave lens 110 and the convex lens 109 via the beam splitter 202. The light beam 150 is condensed by the objective lens 103 and the SIL 102, and incident onto the optical disc 101. The beam splitter 202 allows incidence of reflection light from the optical disc 101 onto the photoelectric converter (hereinafter, called as a "detector") 121.

The detector 121 is operable to output a photoelectric conversion signal 122 for generating a focus error signal 128, a gap error signal 129, a tracking error signal 130, and an RF signal 132 to be described next.

The photoelectric conversion signal 122 is inputted to the focus error signal generating circuit 123, the gap error signal generating circuit 124, the tracking error signal generating circuit 125, and the RF signal generating circuit 127, respectively. The focus error signal generating circuit 123, the gap error signal generating circuit 124, the tracking error signal generating circuit 125, and the RF signal generating circuit 127 respectively generate and output the focus error signal 128, the gap error signal 129, the tracking error signal 130, and the RF signal 132. In the first embodiment, a four-divided detector is employed as the detector 121. Accordingly, the photoelectric conversion signal 122 embraces four kinds of signals.

The optical disc device in accordance with the first embodiment employs an astigmatism method as an example of focus error detecting method, and a push-pull method as an example of tracking error signal detecting method. Accordingly, the focus error signal generating circuit 123 is operable to output the focus error signal 128 to the focus control circuit 133 and the CPU 200 in accordance with the rule of the astigmatism method. The tracking error signal generating circuit 125 is operable to output the tracking error signal 130 to the tracking control circuit 135 and the CPU 200 in accordance with the rule of the push-pull method. The focus error detecting method and the tracking error signal detecting method are not specifically limited to the above examples, but may employ other method.

The focus control circuit 133 is operable to output a focus control current 137 based on the focus error signal 128 for driving the focus control actuator 111. Thereby, focus control with respect to the targeted information recording/reproducing surface 101b of the optical disc 101 is established. The tracking control circuit 135 is operable to output a tracking control current 139 based on the tracking error signal 130 for driving the tracking control actuator 107. Thereby, tracking control with respect to the targeted information recording/reproducing surface 101b of the optical disc 101 is established.

The gap error signal 129 is generated by summing up four kinds of signals of the photoelectric conversion signal 122. In this sense, the gap error signal generating circuit 124 is a summation circuit for summing up four kinds of signals of the photoelectric conversion signal 122, and the level of the gap error signal 129 is associated with the gap 105. The gap error signal generating circuit 124 is operable to generate and output the gap error signal 129 based on the photoelectric conversion signal 122.

In response to receiving the gap error signal 129, the gap control circuit 134 is operable to perform comparative amplification between the gap error signal 129 and a predetermined reference value, and subject the amplification result to an electrical processing as necessary to acquire a gap control current 138 for driving the gap control actuator 108, whereby gap control of setting the distance between the surface of the SIL 102 and the surface of the optical disc 101 to a constant value is established.

The RF signal 132 is generated by summing up four kinds of signals of the photoelectric conversion signal 122. In this sense, the RF signal generating circuit 127 is a summation circuit for summing up four kinds of signals of the photoelectric conversion signal 122. The RF signal generating circuit 127 is basically the same as the gap error signal generating circuit 124, but is different in a target signal bandwidth. The RF signal generating circuit 127 is operable to generate the RF signal 132 based on the photoelectric conversion signal 122, and output the RF signal 132 to a signal processing circuit (not shown) and the CPU 200.

The recording control circuit 136 functions as a recording controller. Digitized recording information 160, recording condition setting data 161, a recording control command i.e. a recording ON/OFF command 162, and the like are supplied from the CPU 200. In response to activation of the recording ON/OFF command 162, the recording control circuit 136 generates a recording pulse train 163 based on the digitized recording information 160 and the recording condition setting data 161, and outputs the recording pulse train 163 to the light source 120.

Then, the light beam 150 as emission light from the light source 120 is subjected to intensity modulation by the recording pulse train 163, and the recording information 160 is recorded in the optical disc 101 based on the recording condition setting data 161.

The recording condition setting data 161 is data for determining at least one of a pulse width of the recording pulse train 163 for modulating the light source 120, a pulse interval of the recording pulse train 163, and a recording power (i.e. amplitude) of the recording pulse train 163. The recording condition setting data 161 is stored in advance in a memory in the CPU 200.

The CPU 200 issues a control command 142 for the focus control circuit 133, a control command 143 for the gap control circuit 134, and a control command 144 for the tracking control circuit 135 to the control circuits 133, 134, and 135, respectively. The control commands 142, 143, and 144 are commands for determining ON/OFF states of the respective controls.

The CPU 200 is incorporated with a program for observing the focus error signal 128 and the tracking error signal 130. The CPU 200 is internally provided with an AD converter. The CPU 200 is operable to observe the focus error signal 128 and the tracking error signal 130 by executing the program in response to input of the focus error signal 128 and the tracking error signal 130 via the AD converter. The CPU 200 is further incorporated with a program for measuring a jitter of the RF signal 132. The CPU 200 is operable to measure a jitter of the RF signal 132 by executing the program in response to input of the RF signal 132 via the AD converter.

In the above arrangement, the CPU 200 functions as a focus position adjusting circuit, and is operable to adjust the condensing position of light emitted from the SIL 102 with respect to the information recording/reproducing surface 101b of the optical disc 101, based on an offset of the focus error signal. The CPU 200 also functions as a coma aberration correcting circuit, and is operable to correct coma aberration in focus position adjustment, based on an amplitude of the tracking error signal 130 or an offset of the tracking error signal 130. Accordingly, the CPU 200 is operable to automatically perform focus position adjustment and coma aberration correction based on a state of the focus error signal 128 and a state of the tracking error signal 130, respectively.

The CPU 200 is also operable to perform focus position adjustment until the jitter is optimized, and perform coma aberration until the jitter is optimized, while measuring the jitter of the RF signal 132. Accordingly, in establishing focus control and tracking control, focus position adjustment and coma aberration correction can be automatically performed, while measuring the jitter of the RF signal 132.

An operation to be performed by the optical disc device having the above arrangement in accordance with the first embodiment is described, including a method for activating the optical disc device.

First, the gap control circuit 134 establishes gap control by executing the following operation based on the arrangement relating to gap control. Specifically, after the control command 143 to be issued from the CPU 200 to the gap control circuit 134 is activated, the gap control circuit 134 supplies, to the gap control actuator 108, a current for moving the SIL 102 toward the optical disc 101, as the gap control current 138; and switches the gap control current 138 to a current obtained by processing the gap error signal 129, in the case where the level of the gap error signal 129 is approximated to a predetermined level corresponding to a predetermined gap 105. Thus, gap control of setting the gap between the SIL 102 and the optical disc 101 to a constant value is established.

In this way, establishing gap control corresponds to a first step in the method for activating the optical disc device in accordance with the first embodiment of the invention. At a point of time when the first step has been completed, as described in the section of the Description of the Background Art, the focus position is greatly displaced from a targeted information recording/reproducing surface.

Observing the focus error signal 128 in the above state, the focus error signal 128 has a signal level substantially the same as the level of a direct current signal with respect to a GND level 40. Accordingly, an S-shaped signal indicating that the focus position is set within the dynamic range of a targeted information recording/reproducing surface is not observed. Also, it is a well-known fact that the farther the focus position is displaced from the dynamic range of a targeted information recording/reproducing surface, the more the direct current level (i.e. offset) of the focus error signal 128 is increased.

In view of the above, the CPU 200 is operable to adjust the focus position, using the convex lens 109, the concave lens 110, the feed stage 112, the feed screw 114, and the stepping motor 115, while monitoring the offset of the focus error signal 128. Specifically, the CPU 200 outputs the drive pulse 118 to drive the stepping motor 115.

Figure 3:
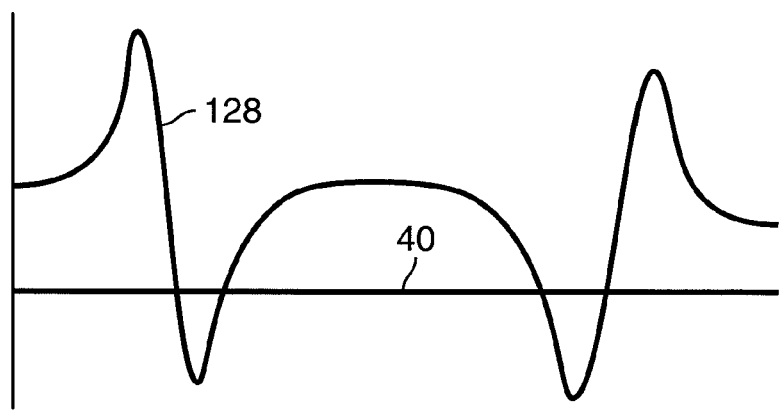
FIG. 3 is a waveform diagram showing a focus error signal in a state that focus position adjustment is insufficient.

In response to output of the drive pulse 118, the concave lens 110 is moved in the optical axis direction shown in FIG. 1 i.e. upward or downward direction on the plane of FIG. 1. Thereby, the focus position is set within the dynamic range of the targeted information recording/reproducing surface 101b. FIG. 3 shows the above state of the focus error signal 128. Specifically, although an S-shaped signal indicating that the focus position is within the dynamic range of the targeted information recording/reproducing surface 101b is started to be observed, the S-shaped signal is asymmetrical with respect to the GND level 40, and the offset of the focus error signal 128 is large.

Figure 4:
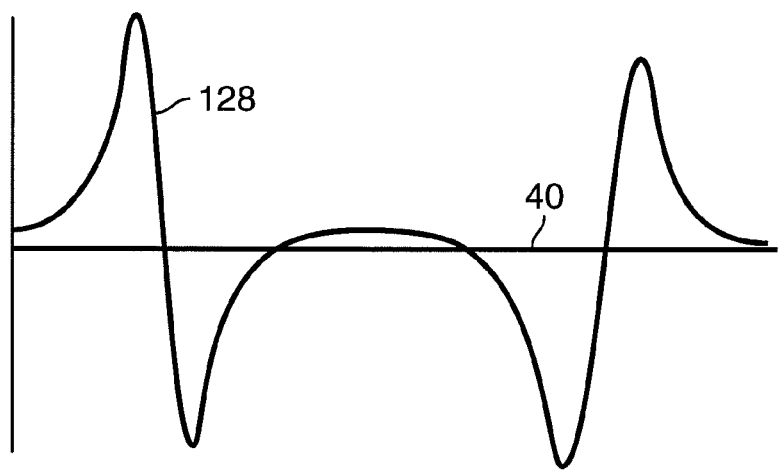
FIG. 4 is a waveform diagram showing a focus error signal in a state that focus position adjustment is sufficient.

Then, the CPU 200 continues adjusting the focus position, while monitoring the offset level of the focus error signal 128. Thereby, as shown in FIG. 4, the S-shaped signal of the focus error signal 128 becomes substantially symmetrical with respect to the GND level 40, and the offset level (i.e. DC component) is substantially equal to the GND level 40. In other words, the average level of the focus error signal 128 becomes substantially zero. Then, the CPU 200 terminates the focus position adjustment. In this way, the focus position adjustment corresponds to a second step in the method for activating the optical disc device in accordance with the first embodiment.

Subsequently, in the case where the control command 142 to be issued from the CPU 200 to the focus control circuit 133 is activated, the focus control circuit 133 causes the focus control actuator 111 to move the position of the concave lens 110. In the case where the focus position is set on the information recording/reproducing surface 101b, as a result of moving the position of the concave lens 110, focus control is established.

Figure 5:
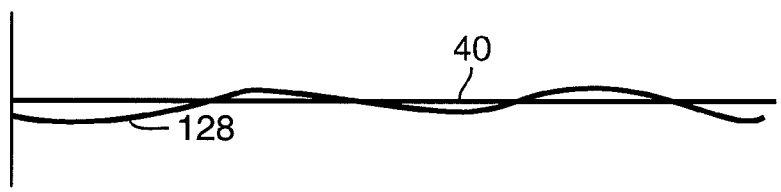
FIG. 5 is a waveform diagram showing a focus error signal in a state that focus control has been established.

Specifically, as shown in FIG. 5, the average level (i.e. DC component) of the focus error signal 128 becomes substantially zero, and the focus position follows positional displacement of the targeted information recording/reproducing surface of the optical disc 101. Thereby, observation of the tracking error signal 130 is enabled. In this way, establishing focus control corresponds to a third step in the method for activating the optical disc device in accordance with the first embodiment.

As described in the section of Description of the Background Art, however, in the third step, the concave lens 110 is decentered with respect to the optical axis LA by focus position adjustment. As a result, the light beam 150 is condensed on the targeted information recording/reproducing surface 101b of the optical disc 101 with a certain degree of divergence, due to generation of coma aberration.

Figure 6:
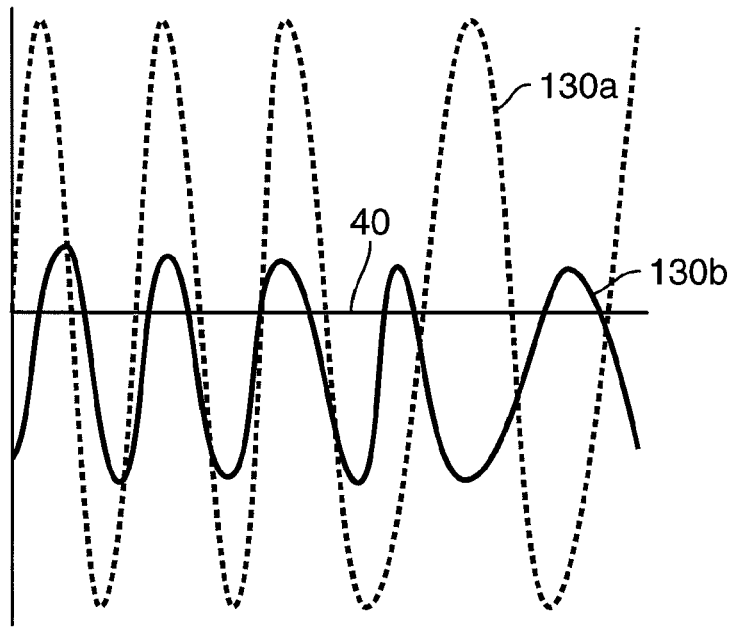
FIG. 6 is a waveform diagram showing a tracking error signal subjected to coma aberration correction, and a tracking error signal including coma aberration.

FIG. 6 shows a tracking error signal 130 in a state that coma aberration has occurred. Referring to FIG. 6, the dotted line indicates a signal state of a tracking error signal 130a free from coma aberration, and the solid line indicates a signal state of a tracking error signal 130b whose signal quality is deteriorated resulting from coma aberration.

As shown by the solid line in FIG. 6, generation of coma aberration results in lowering of the amplitude of the tracking error signal 130b, as compared with a normal amplitude (i.e. the amplitude of the tracking error signal 130a. Further, the center of amplitude of AC component of the tracking error signal 130b is greatly displaced from the GND level 40, and the offset of the tracking error signal 130b is large. In this case, the CPU 200 performs coma aberration correction by using the feed stage 113, the feed screw 116, and the stepping motor 117, while monitoring the amplitude of the tracking error signal 130.

Specifically, the CPU 200 supplies the drive pulse 119 to the stepping motor 117 to move the concave lens 110 in the right-angled direction LV (i.e. in leftward or rightward direction on the plane of FIG. 1) with respect to the optical axis direction of the light beam 150, as necessary. For instance, the CPU 200 moves the concave lens 110 in a first direction of the right-angled direction LV by a predetermined pitch; and then, sequentially moves the concave lens 110 in the first direction by the predetermined pitch, if the amplitude of the tracking error signal is increased, or moves the concave lens 110 in a second direction opposite to the first direction by the predetermined pitch, if the amplitude of the tracking error signal is decreased to search for a position where the amplitude of the tracking error signal is maximum. On the other hand, in the case where the amplitude of the tracking error signal is decreased for the first time, the CPU 200 moves the concave lens 110 in the second direction by the predetermined pitch, and then, sequentially moves the concave lens 110 in the second direction by the predetermined pitch in the similar manner as described above to search for a position where the amplitude of the tracking error signal is maximum.

The concave lens 110 is moved in such a direction as to cancel a decentered amount generated by the focus position adjustment. Thus, coma aberration correction is performed. Thereby, the amplitude of the tracking error signal 130b becomes equal to the normal amplitude of the tracking error signal 130a indicated by the dotted line in FIG. 6, with the center of amplitude of AC component of the tracking error signal 130a being approximated to the GND level 40, which means that the offset (i.e. DC component) of the tracking error signal 130a becomes substantially zero. In other words, the CPU 200 terminates coma aberration correction, in the case where the amplitude of the tracking error signal 130a becomes maximum. In this way, coma aberration correction corresponds to a fourth step in the method for activating the optical disc device in accordance with the first embodiment.

In the first embodiment, coma aberration correction is performed by monitoring the amplitude of the tracking error signal 130. Referring to FIG. 6, the offset of the tracking error signal 130 is maximum before coma aberration correction is performed, and the offset becomes substantially zero after the coma aberration has been performed. In view of this, coma aberration correction may be performed while monitoring the offset of the tracking error signal 130.

Subsequently, the CPU 200 activates the control command 144 for tracking control to establish tracking control of causing the focus position to trace a predetermined track on the information recording/reproducing surface 101b, while following decentering of the information recording/reproducing surface 101b. This enables to secure sufficient tracking follow-up performance. In this way, establishing tracking control corresponds to a fifth step in the method for activating the optical disc device in accordance with the first embodiment.

In this embodiment, observation of the focus error signal 128 and the tracking error signal 130 is executed by the CPU 200. Alternatively, the observation may be executed by using a dedicated observing circuit and control circuit, or a measuring device such as an oscilloscope.

As described above, according to the arrangement of the optical disc device in accordance with the first embodiment, performing the above five steps completes activation of the optical disc device in a state that focus position adjustment and coma aberration correction have been performed. This enables to optimize the recording/reproducing condition of a signal.

It is more effective to execute the following steps in addition to the above five steps for further focus position adjustment and coma aberration correction, as necessary. Specifically, after the first through the fifth steps are completed, it may be preferable to perform a sixth step of performing a test recording operation of recording information in the optical disc 101 in a predetermined recording condition by operating the recording control circuit 136; a seventh step of reproducing the test-recorded information in the sixth step, and performing focus position adjustment until the jitter of an RF signal 132 obtained by reproducing the recorded information is optimized, while measuring the jitter of the RF signal 132; and an eighth step of performing coma aberration correction until the jitter is optimized, while measuring the jitter.

In this embodiment, the predetermined recording condition is to a pulse width of the recording pulse train 163, an interval of pulses preceding and succeeding the recording pulse train 163, and a recording power of the recording pulse train 163. It is preferable to perform a test recording operation of recording information in the optical disc 101, using at least one of the above parameters.

Specifically, in establishing focus control and tracking control, the CPU 200 causes the recording control circuit 136 to perform a test recording operation of recording information in the optical disc 101 in a predetermined recording condition, using the light source 120. Then, the photoelectric converter 121 generates a photoelectric conversion signal 122 based on reproduction light corresponding to the test-recorded information, and the RF signal generating circuit 127 generates an RF signal 132 based on the photoelectric conversion signal 122. Then the CPU 200 performs focus position adjustment by moving the concave lens 110 in the optical axis direction until the jitter of the RF signal 132 is optimized, while measuring the jitter of the RF signal 132. Then, in the similar manner as described above, the CPU 200 performs coma aberration correction by moving the concave lens 110 in the right-angled direction LV until the jitter is optimized, while measuring the jitter.

Adding the sixth through the eighth steps optimizes the focus position and optimizes coma aberration correction with respect to a reproduction signal from the optical disc 101 subjected to an actual recording operation. Accordingly, as compared with a method consisting of the first through the fifth steps, the modification is advantageous in further optimizing the recording/reproducing condition of the optical disc device.

According to a further research conducted by the inventors of the present application, repeating the sixth to the eighth steps multiple times is advantageous in further optimizing the recording/reproducing condition of the optical disc device. The research result also shows that repeating the sixth to the eighth steps two or more times is sufficient.

In the seventh step of performing focus position adjustment while monitoring a jitter of the RF signal 132, an offset summation function may be added to the focus control circuit 133 so that the focus control circuit 133 is operable to supply a direct current to the focus control actuator 111 for driving the concave lens 110 to move the concave lens 110 in the optical axis direction of the light beam 150.

The method for measuring a jitter of the RF signal 132 is not specifically limited to the above example. Alternatively, although not illustrated, a measuring device such as a time interval analyzer may be provided to measure a jitter of the RF signal 132.

In the seventh and the eighth steps, focus position adjustment and coma aberration correction are performed while measuring a jitter of the RF signal 132. Alternatively, an amplitude of the RF signal 132, or an error rate to be obtained by subjecting the RF signal 132 to a proper processing may be used as a signal quality index of the RF signal 132, in place of measuring a jitter of the RF signal 132. The modification enables to obtain substantially the same effect as described above.

In the case where the optical disc 101 is of a reproduction-only type or a recording/reproducing type, as far as a certain area of the optical disc 101 can be used solely for reproduction, the sixth step may be performed exclusively to reproduce from the area of the optical disc 101. In the modification, the seventh step and the eighth step correspond to execution of focus position adjustment and coma aberration correction while measuring a jitter of the RF signal 132 to be obtained by performing a reproducing operation. The modification is advantageous in further optimizing the reproducing condition of the optical disc device.

Specifically, after the first through the fifth steps are completed, in establishing focus control and tracking control, a sixth step of generating an RF signal 132 by reproducing information recorded in the optical disc 101 may be executed; then, a seventh step of measuring the signal quality index of the RF signal obtained by reproducing the information, and performing focus position adjustment until the signal quality index is optimized may be executed; and then, an eighth step of measuring the signal quality index of the RF signal 132 obtained by reproducing the information, and performing coma aberration correction until the signal quality index is optimized may be executed.

More specifically, in establishing focus control and tracking control, the CPU 200 causes the recording control circuit 136 to reproduce information recorded in the optical disc 101 in a predetermined reproducing condition, using the light source 120. Then, the photoelectric converter 121 generates a photoelectric conversion signal 122 based on reproduction light, and the RF signal generating circuit 127 generates an RF signal 132 based on the photoelectric conversion signal 122. Then, the CPU 200 performs focus position adjustment of moving the concave lens 110 in the optical axis direction until a jitter of the RF signal 132 is optimized, while measuring the jitter of the RF signal 132 as a signal quality index. Then, the CPU 200 performs coma aberration correction of moving the concave lens 110 in the right-angled direction LV until the jitter is optimized, while measuring the jitter, in the similar manner as described above. Preferably, the signal quality index may include at least one of an amplitude, a jitter, and an error rate of the RF signal 132.

As described above, in the first embodiment, the recording/reproducing condition of the optical disc device can be optimized by providing a coma aberration corrector, in addition to a gap controller, a focus position adjuster, a focus controller, and a tracking controller constituting an optical disc device of SIL system.

The following is a summary of the embodiment of the invention. As described above, an optical disc device according to an aspect of the invention includes: a light source; a condensing system including a solid immersion lens for emitting light from the light source onto an optical disc; a gap controller for performing gap control of setting a distance between the solid immersion lens and the optical disc to a constant value; a focus position adjuster for performing focus position adjustment of adjusting a condensing position of light to be emitted from the solid immersion lens with respect to an information recording/reproducing surface of the optical disc; a focus error signal generator for generating a focus error signal based on light from the information recording/reproducing surface; a focus controller for performing focus control of setting the condensing position on the information recording/reproducing surface, while following plane displacement of the information recording/reproducing surface, using the focus error signal; and a coma aberration corrector for performing coma aberration correction of correcting coma aberration in the focus position adjustment by moving at least one of lenses to be used in the focus position adjustment in a direction perpendicularly intersecting with an optical axis.

In the optical disc device having the above arrangement, coma aberration in focus position adjustment is corrected by moving at least one of the lenses to be used in the focus position adjustment in the direction perpendicularly intersecting with the optical axis. This enables to suppress coma aberration, with the distance between the solid immersion lens and the optical disc being set to the constant value. As a result, unlike an arrangement for BD, wherein coma aberration is corrected by changing a relative tilt between an optical disc and an objective lens, coma aberration by decentering resulting from focus position adjustment can be corrected, without changing a relative tilt between the optical disc and the solid immersion lens. This enables to provide an optical disc device of SIL system free from a drawback that the solid immersion lens may collide against the optical disc in correcting comma aberration.

Preferably, the focus position adjuster may include a beam expander constituted of a fixed lens and a moving lens, and may be operable to adjust the condensing position with respect to the information recording/reproducing surface by moving the moving lens in a direction of the optical axis, and the coma aberration corrector may be operable to correct the coma aberration by moving the moving lens in the direction perpendicularly intersecting with the optical axis.

In the above arrangement, decentering of the moving lens resulting from focus position adjustment can be corrected by moving the moving lens in the direction perpendicularly intersecting with the optical axis. This enables to correct coma aberration by decentering resulting from focus position adjustment, with a simplified arrangement without changing a relative tilt between the optical disc and the solid immersion lens.

Preferably, the focus position adjuster may be operable to adjust the condensing position with respect to the information recording/reproducing surface, based on an offset of the focus error signal.

In the above arrangement, the emission light from the solid immersion lens can be accurately condensed on the intended information recording/reproducing surface of the optical disc by adjusting the condensing position of the emission light from the solid immersion lens in such a manner that the offset of the focus error signal becomes substantially zero.

Preferably, the optical disc device may further include a tracking error signal generator for generating a tracking error signal based on the light from the information recording/reproducing surface, and a tracking controller for performing tracking control of causing the condensing position to trace a predetermined track on the information recording/reproducing surface, while following decentering of the optical disc, wherein the coma aberration corrector is operable to correct the coma aberration, based on an amplitude of the tracking error signal or an offset of the tracking error signal.

In the above arrangement, coma aberration by decentering resulting from focus position adjustment can be securely corrected by moving at least one of the lenses to be used in the focus position adjustment in the direction perpendicularly intersecting with the optical axis in such a manner that the amplitude of the tracking error signal becomes maximum or the offset of the tracking error signal becomes substantially zero.

Preferably, the optical disc device may further include an RF signal generator for generating an RF signal based on the light from the information recording/reproducing surface, wherein the focus position adjuster and the coma aberration corrector are operable to perform the focus position adjustment and the coma aberration correction, respectively, based on a signal quality index of the RF signal in establishing the focus control and tracking control.

In the above arrangement, the reproducing condition of the optical disc device can be further optimized by performing the focus position adjustment and the coma aberration correction in such a manner that the signal quality index of the RF signal is optimized.

Preferably, the signal quality index may include at least one of an amplitude, a jitter, and an error rate of the RF signal.

In the above arrangement, the reproducing condition of the optical disc device can be further optimized by performing the focus position adjustment and the coma aberration correction in such a manner that at least one of the amplitude, the jitter, and the error rate of the RF signal is optimized.

Preferably, the optical disc device may further include a recording controller for performing a test recording operation of recording information in a predetermined recording condition by modulating an intensity of the emission light of the light source in establishing the focus control and tracking control, and an RF signal generator for generating an RF signal based on reproduction light corresponding to the recorded information, wherein the focus position adjuster and the coma aberration corrector are operable to perform the focus position adjustment and the coma aberration correction, respectively, based on a signal quality index of the RF signal to be obtained by reproducing the recorded information.

In the above arrangement, the information is test-recorded in the predetermined recording condition, and the focus position adjustment and the coma aberration correction are performed in such a manner that the signal quality index of the RF signal to be obtained by reproducing the recorded information is optimized. Accordingly, the focus position adjustment is optimized and the coma aberration correction is optimized with respect to an optical disc for actual use, which is advantageous in further optimizing the recording/reproducing condition of the optical disc device.

Preferably, the predetermined recording condition may include at least one of a pulse width, a pulse interval, and a recording power of a recording pulse train for modulating the intensity of the emission light of the light source.

In the above arrangement, the focus position adjustment and the coma aberration correction are performed in such a manner that at least one of the pulse width, the pulse interval, and the recording power of the recording pulse train is optimized. Accordingly, the focus position adjustment is optimized and the coma aberration correction is optimized with respect to an optical disc for actual use, which is advantageous in further optimizing the recording/reproducing condition of the optical disc device.

A method for activating an optical disc device according to another aspect of the invention includes: a first step of performing gap control of setting a distance between a solid immersion lens for emitting light from a light source onto an optical disc, and the optical disc to a constant value; a second step of performing focus position adjustment of adjusting a condensing position of light to be emitted from the solid immersion lens with respect to an information recording/reproducing surface of the optical disc; a third step of performing focus control of setting the condensing position on the information recording/reproducing surface, while following plane displacement of the information recording/reproducing surface, using a focus error signal to be generated based on light from the information recording/reproducing surface; and a fourth step of performing coma aberration correction of correcting coma aberration in the focus position adjustment by moving at least one of lenses to be used in the focus position adjustment in a direction perpendicularly intersecting with an optical axis.

The method for activating an optical disc device having the above arrangement enables to provide a method for activating an optical disc device of SIL system capable of performing a recording/reproducing operation in a state that the focus position and the coma aberration are optimized.

A control circuit according to yet another aspect of the invention includes: a gap control circuit for performing gap control of setting a distance between a solid immersion lens for emitting light from a light source onto an optical disc, and the optical disc to a constant value; a focus position adjusting circuit for performing focus position adjustment of adjusting a condensing position of light to be emitted from the solid immersion lens with respect to an information recording/reproducing surface of the optical disc; a focus control circuit for performing focus control of setting the condensing position on the information recording/reproducing surface, while following plane displacement of the information recording/reproducing surface, using a focus error signal to be generated based on light from the information recording/reproducing surface; and a coma aberration correcting circuit for performing coma aberration correction of correcting coma aberration in the focus position adjustment by moving at least one of lenses to be used in the focus position adjustment in a direction perpendicularly intersecting with an optical axis.

According to the invention, there are provided an optical disc device and an optical disc device activating method capable of optimizing the recording/reproducing condition of a signal by providing a focus position adjuster and a coma aberration adjuster. Accordingly, the invention is useful as an optical disc device for recording a signal in an optical disc and/or reproducing a signal from an optical disc.

This application is based on Japanese Patent Application No. 2008-135131 filed on May 23, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical disc device comprising:
   a light source;
   a condensing system including a solid immersion lens for emitting light from the light source onto an optical disc;
   a gap controller for performing gap control of setting a distance between the solid immersion lens and the optical disc to a constant value;
   a focus position adjuster for performing focus position adjustment of adjusting a condensing position of light to be emitted from the solid immersion lens with respect to an information recording/reproducing surface of the optical disc;
   a focus error signal generator for generating a focus error signal based on light from the information recording/reproducing surface;
   a focus controller for performing focus control of setting the condensing position on the information recording/reproducing surface, while following plane displacement of the information recording/reproducing surface, using the focus error signal; and a coma aberration corrector for performing coma aberration correction of correcting coma aberration in the focus position adjustment by moving at least one of lenses to be used in the focus position adjustment in a direction perpendicularly intersecting with an optical axis.

2. The optical disc device according to claim 1, wherein the focus position adjuster includes a beam expander constituted of a fixed lens and a moving lens, and is operable to adjust the condensing position with respect to the information recording/reproducing surface by moving the moving lens in a direction of the optical axis, and the coma aberration corrector is operable to correct the coma aberration by moving the moving lens in the direction perpendicularly intersecting with the optical axis.

3. The optical disc device according to claim 1, wherein the focus position adjuster is operable to adjust the condensing position with respect to the information recording/reproducing surface, based on an offset of the focus error signal.

4. The optical disc device according to claim 1, further comprising:

a tracking error signal generator for generating a tracking error signal based on the light from the information recording/reproducing surface; and a tracking controller for performing tracking control of causing the condensing position to trace a predetermined track on the information recording/reproducing surface, while following decentering of the optical disc, wherein the coma aberration corrector is operable to correct the coma aberration, based on an amplitude of the tracking error signal or an offset of the tracking error signal.

5. The optical disc device according to claim 4, further comprising:

an RF signal generator for generating an RF signal based on the light from the information recording/reproducing surface, wherein the focus position adjuster and the coma aberration corrector are operable to perform the focus position adjustment and the coma aberration correction, respectively, based on a signal quality index of the RF signal in establishing the focus control and tracking control.

6. The optical disc device according to claim 5, wherein the signal quality index includes at least one of an amplitude, a jitter, and an error rate of the RF signal.

7. The optical disc device according to claim 4, further comprising:

a recording controller for performing a test recording operation of recording information in a predetermined recording condition by modulating an intensity of the emission light of the light source in establishing the focus control and tracking control; and an RF signal generator for generating an RF signal based on reproduction light corresponding to the recorded information, wherein the focus position adjuster and the coma aberration corrector are operable to perform the focus position adjustment and the coma aberration correction, respectively, based on a signal quality index of the RF signal to be obtained by reproducing the recorded information.

8. The optical disc device according to claim 7, wherein the predetermined recording condition includes at least one of a pulse width, a pulse interval, and a recording power of a recording pulse train for modulating the intensity of the emission light of the light source.

9. A method for activating an optical disc device, comprising:

a first step of performing gap control of setting a distance between a solid immersion lens for emitting light from a light source onto an optical disc, and the optical disc to a constant value;

a second step of performing focus position adjustment of adjusting a condensing position of light to be emitted from the solid immersion lens with respect to an information recording/reproducing surface of the optical disc;

a third step of performing focus control of setting the condensing position on the information recording/reproducing surface, while following plane displacement of the information recording/reproducing surface, using a focus error signal to be generated based on light from the information recording/reproducing surface; and a fourth step of performing coma aberration correction of correcting coma aberration in the focus position adjustment by moving at least one of lenses to be used in the focus position adjustment in a direction perpendicularly intersecting with an optical axis.

10. A control circuit comprising:

a gap control circuit for performing gap control of setting a distance between a solid immersion lens for emitting light from a light source onto an optical disc, and the optical disc to a constant value;

a focus position adjusting circuit for performing focus position adjustment of adjusting a condensing position of light to be emitted from the solid immersion lens with respect to an information recording/reproducing surface of the optical disc;

a focus control circuit for performing focus control of setting the condensing position on the information recording/reproducing surface, while following plane displacement of the information recording/reproducing surface, using a focus error signal to be generated based on light from the information recording/reproducing surface; and a coma aberration correcting circuit for performing coma aberration correction of correcting coma aberration in the focus position adjustment by moving at least one of lenses to be used in the focus position adjustment in a direction perpendicularly intersecting with an optical axis.

* * * * *